United States Patent [19]

Tanihata et al.

[11] 4,236,049
[45] Nov. 25, 1980

[54] ELECTRONIC KEY TELEPHONE SYSTEM

[75] Inventors: Ryoichi Tanihata; Tsunehiko Shimazawa; Yoshihisa Shibayama, all of Tokyo, Japan

[73] Assignee: Nippon Electric Co., Ltd., Tokyo, Japan

[21] Appl. No.: 972,789

[22] Filed: Dec. 26, 1978

[30] Foreign Application Priority Data

Dec. 27, 1977 [JP] Japan .................................. 52-158824

[51] Int. Cl.³ .............................................. H04Q 5/20
[52] U.S. Cl. .................................. 179/99 R; 179/99 P; 179/18 GF
[58] Field of Search ........ 179/99, 1 HF, 1 H, 18 AD, 179/18 ES, 18 GE, 37, 18 GF

[56] References Cited

U.S. PATENT DOCUMENTS

| 3,647,980 | 3/1972 | Fabiano, Jr. et al. | 179/99 R |
| 3,743,791 | 7/1973 | Duff et al. | 179/99 |
| 3,976,847 | 8/1976 | Bidlack et al. | 179/99 |
| 4,063,047 | 12/1977 | Huryn | 179/99 |
| 4,158,112 | 6/1979 | Cerbone et al. | 179/18 AD |

Primary Examiner—Gerald L. Brigance
Attorney, Agent, or Firm—Laff, Whitesel & Rockman

[57] ABSTRACT

A key telephone system includes among other things a central switching network comprises of a main switch matrix including main talking paths and trunk paths, an auxiliary switch matrix including auxiliary talking paths and a coupling matrix between the main and auxiliary switch matrices and in which system each of the telephone station sets can talk through a plurality of talking paths, concurrently, and is capable of talking back hand-free.

4 Claims, 7 Drawing Figures

VOICE INTERFACE

CROSS POINT POTENTIAL CONTROL CIRCUIT

ELECTRONIC KEY TELEPHONE SYSTEM

BACKGROUND OF THE INVENTION

This invention relates to electronic key telephone systems (EKTS) and more particularly to those of the type enabling the user of any key telephone station set (TS) in the system to make different kinds of calls at the same time.

Previously known is an electronic key telephone system which uses the stored program type of control, including a plurality of telephone station sets each connected through two pairs of data transmission and reception lines and a pair of voice communication lines to a central key service unit including a central processor and space division communication paths employing electronic contacts. Such key telephone system is characteristically easy to install because of the extreme reduction in the number of cable conductors needed and has a variety of service functions (see the article "A Configuration of Key Telephone System" (in Japanese), by A. Miura et al, in the Journal of the Institute of Electronics and Communication Engineers of Japan, TGSE-1977-49).

However, key telephone systems of this known form transmit voice signals in the baseband, have often involved inconvenience to the telephone set users because only a single pair of voice communication lines are provided for each station set and hence there is a lack of such additional talking function as may be required for enabling the station set user to answer a second call while holding the first call connected to the station set.

SUMMARY OF THE INVENTION

In view of the above, it is an object of the present invention to provide an electronic key telephone system which is designed to give a particularly high and versatile service to the user, enabling him to talk through two different kinds of communication paths at the same time, while allowing him to talk back hand-free.

According to the present invention, an electronic key telephone system includes a plurality of key telephone station sets, a central switching system for connection between the station sets with a plurality of central office/private branch exchange (CO/PBX) lines or intercom telephone lines, and a central control means for controlling both the station sets and the central switching system each of the telephone station sets includes a telephone handset, a microphone, a speaker and a data circuit. One or two pairs of data lines connect the data circuit to the central control means. A pair of main voice communication or talking paths connect the handset to the central switching means and a pair of auxiliary voice communication or talking paths connect the microphone and speaker to the central switching system at that central switching system a main switch matrix, including thyristor crosspoints, complete paths between main communication paths and a number of trunk paths. An auxiliary switch matrix, also including thyristor crosspoints, completes connections between said auxiliary communication paths and conductors extending across the auxiliary communication paths. A coupling matrix, including thyristor crosspoints, completes connections which are AC-coupled between the trunk paths and conductors extending across the auxiliary communication paths, the arrangement being such that any of the telephone station sets can take two different calls at the same time.

The present invention not only enables each of the telephone station sets in the system to effect two different calls through respective communication paths but also enables the user to talk back hand-free.

BRIEF DESCRIPTION OF THE DRAWINGS

The foregoing and other objects, features and advantages of this invention will become more apparent by reference to the following description taken in conjunction with the accompanying drawings, in which.

DESCRIPTION OF THE PREFERRED EMBODIMENT

Figure 1:
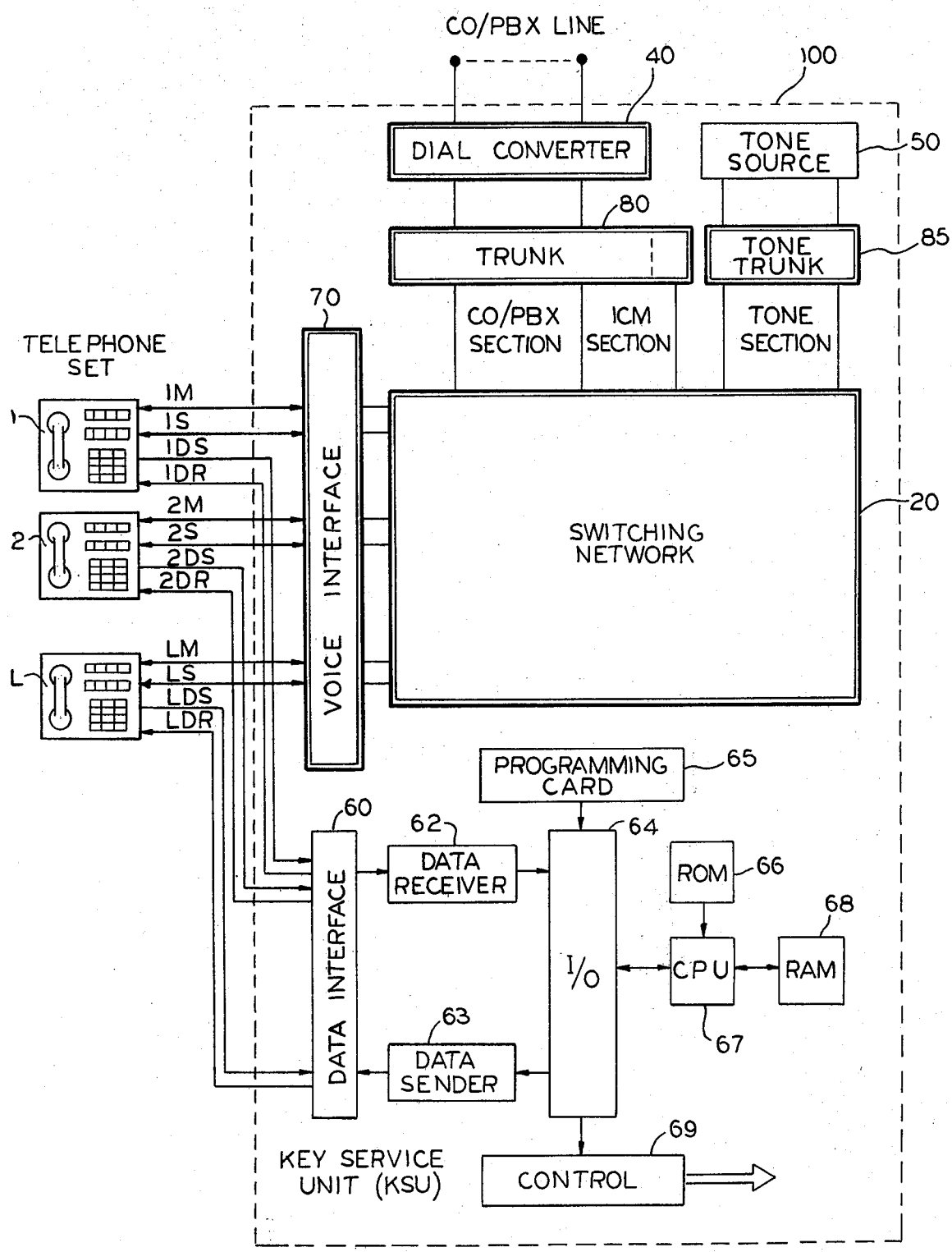
FIG. 1 is a block diagram of an electronic key telephone system aranged according to the present invention.

In FIG. 1, a plurality of key telephone station sets 1, 2, ..., L are each connected with the voice interface 70 of a key service unit (KSU) 100 through a pair of main voice communication paths 1M, 2M, ..., LM and a pair of auxiliary voice communication paths 1S, 2S, ..., LS and with the data interface 60 of the KSU through a pair of data transmission lines 1DS, 2DS, ..., LDS and a pair of data reception lines 1DR, 2DR, ..., LDR. The voice communication system of the KSU 100 includes in addition to the voice interface 70, a switching network 20 for switching between the main and auxiliary voice communication paths and the trunk paths, trunks 80 for DC separation of the switching network 20 from CO/PBX lines, dial signal converters 40, various tone sources 50 and tone trunks 85 for DC separation of the tone sources from the switching network. The common control system of the key service unit includes a central control unit (CPU) 67, ROM 66, RAM 68, a universal programming unit 65, an input/output interface 64, a data sender 63, a data receiver 62, and a control means serving to control those parts of the voice communication system which are shown in double-line blocks.

Figure 2A:
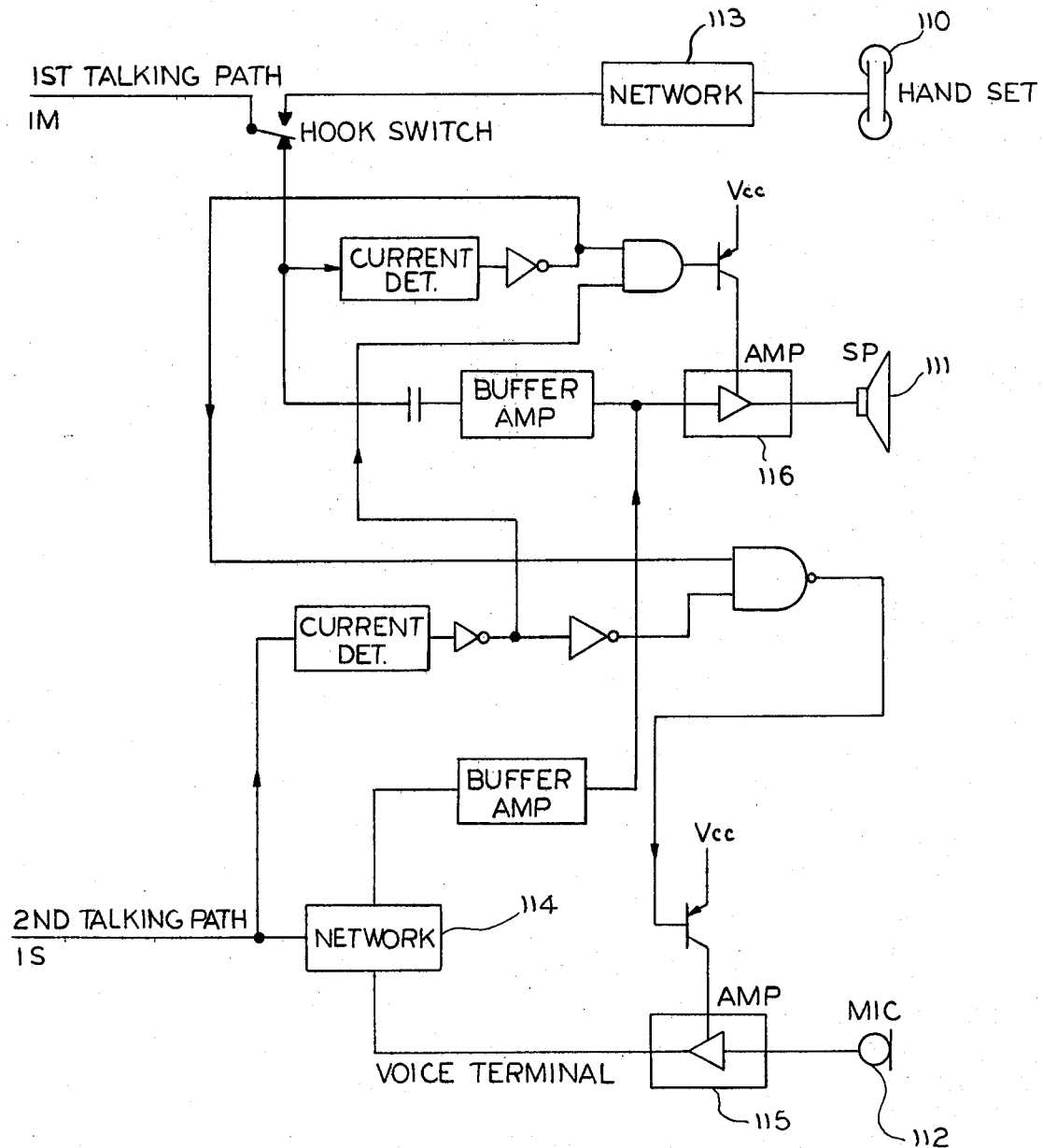
FIG. 2a is a block diagram of the voice terminal of a telephone set in the system of FIG. 1.

In FIG. 2a, the telephone station sets 1, 2, ..., L in the EKTS each includes, in addition to a telephone handset 110, a speaker 111 and a microphone 112. The telephone handset 110 is connected through the telephone network 113 with a first talking path or main voice communication path 1M. The speaker 111 and microphone 12 are connected through respective amplifiers 116 and 115 with the telephone network 114, which is in connection with a second talking path or auxiliary voice communication path 1S.

Figure 2B:
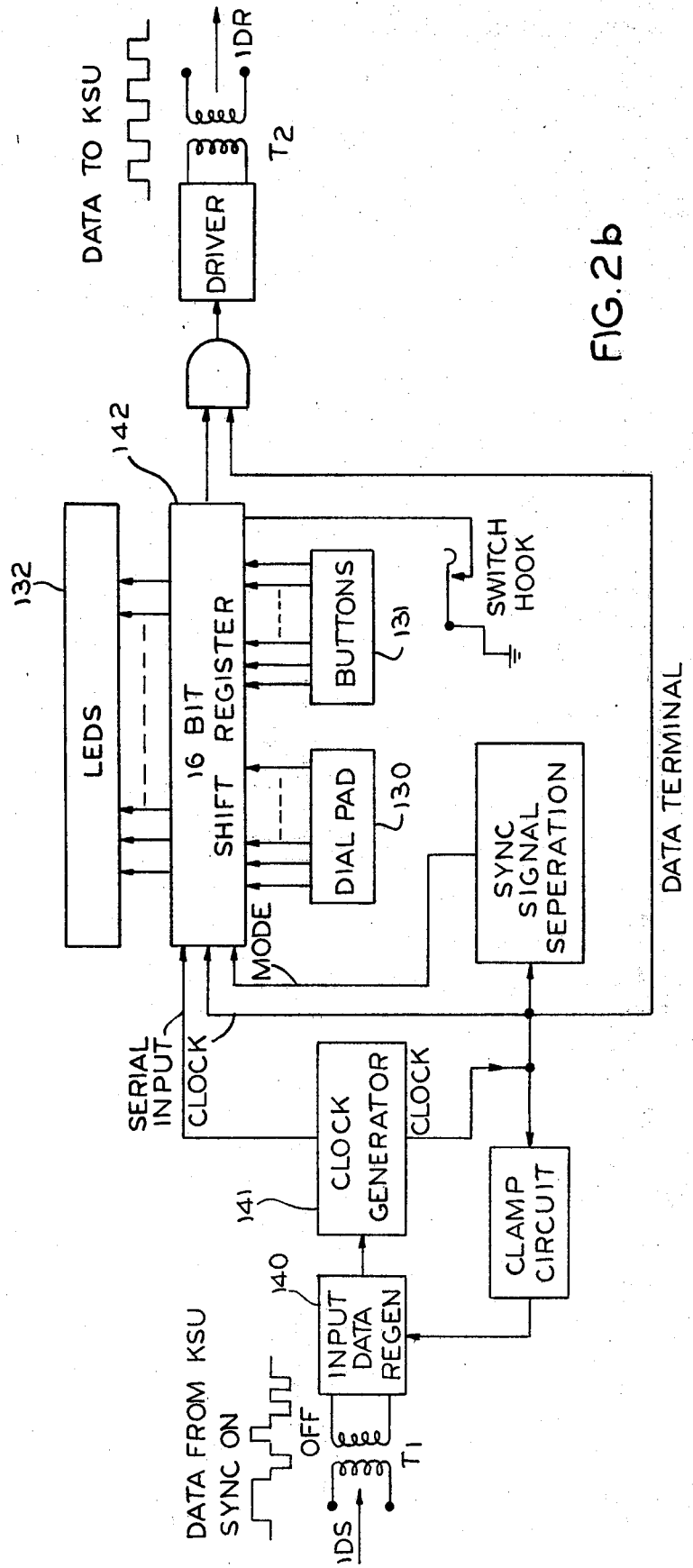
FIG. 2b is a block diagram of the data terminal of the telephone set.

FIG. 2b shows the data section of each of the telephone station sets 1, 2, ..., L, which includes a dial pad 130, pushbuttons or keys 131, light-emitting diodes (LEDs) 132 and a digital circuitry. Received data from the KSU 100 consists of a sync signal indicating the first half of the data signal, a bipolar clock signal following the sync signal, another sync signal indicating the second half of the data signal, and finally a bipolar lamp information/clock signal. Such data first gets rid of any waveform distortion, deriving from the line 1DS and a transformer T1, at an input data regenerator 140 and then the data is converted from a bipolar to a unipolar waveform, at a clock generator 141. Lamp data including a clock signal is fed to the serial input terminal of a 16-bit shift register 142 and is serially shifted here by the clock signal input from the clock generator 141. Such data shifting ceases with the ending of the receive data period, when the LEDs 132 are lighted. The LED status is maintained until the shift register 142 starts again to operate with the next received data. When the telephone station set is receiving data from the KSU, service request data is sent at the same time from the terminal telephone set to the KSU. That is to say, first, a channel line button information and on-hook/off-hook information are applied to the parallel terminals of the 16-bit shift register 142 to be shifted out responsive to the clock signal separated from the data received and then dial, hold and add-on data are sent out in succession through a transformer T2.

In FIG. 1, a 32-bit stream of data from the station set 1, 2, ..., L is first reformed at the data interface 60 and then divided at a data receiver 62 into first and second 16-bit halves. The 16-bit data stream is encoded into a 4-bit data word, including, among others, button and dial data separate from each other, which are stored in a button data memory (not shown) provided in the data receiver 62 for each telephone station set. These data are compared with the data stored during the last preceding scan and the result of such comparison is written as data variation into a data variation memory (not shown). The central processor unit (CPU) makes access to the data variation memory once every approximately 10 milliseconds and, if the variation exists, the CPU reads out from the button data memory those data required by the terminal telephone set to process such data, as required.

The data sender 63 is provided with memories, not shown, for memorizing the status, such as IDLE, RINGING, HOLD or BUSY, of CO/PBX and intercom talking paths and the status, such as IDLE or BUSY, of the different telephone station sets, and such status data are written in the memory by means of the CPU. The data stored are transformed into a predetermined format as they are read out and converted at the data interface 60 into bipolar pulse form to serve through the data receive line 1DR (see FIGS. 1 and 2b) to turn on or off the LDEs, in the manner previously explained.

Figure 3:
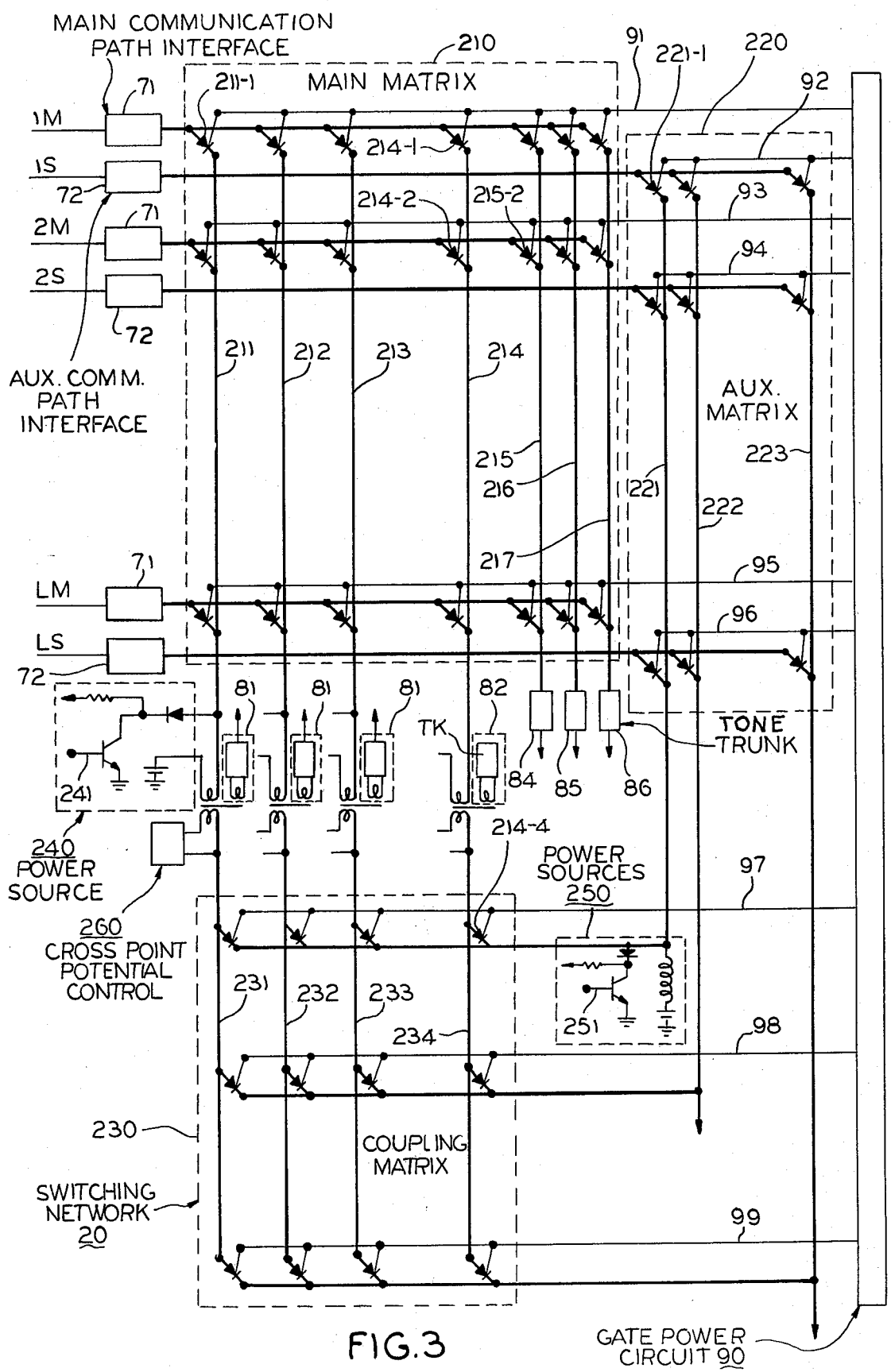
FIG. 3 is a circuit diagram of a switching network which forms a major part of the present invention.

FIG. 3 includes the switching network 20 which comprises a main communication path matrix 210, an auxiliary communication path matrix 220 and a coupling matrix 230. The main communication path matrix 210 includes thyristors arranged at the crosspoints between the main communication paths 1M, 2M, ..., LM connected with the telephone handsets of the respective telephone station sets and the trunk paths 211-217 coupled to the respective trunk circuits. The auxiliary communication path matrix 220 includes the auxiliary communication paths 1S, 2S, ..., LS connected with the speakers and microphones of the telephone station sets, conductors 221-223 aranged across the auxiliary communication paths, and thyristors arranged at the crosspoints between the conductors and the auxiliary communication paths. The coupling matrix 230 includes conductors 231-234, which are AC-coupled to the trunk paths, and thyristors arranged at the crosspoints between these conductors 231-234 and the conductors 221-223 appearing in the auxiliary communication path matrix 220.

The thyristors in each of the switching matrices are connected to gate common lines, in groups, arranged in respective rows of the matrix and connected through the common lines to a gate power circuit 90, which is under control of the CPU. Power sources 240 and 250 are connected respectively to the trunk paths and the conductors 221-223 to supply the cathode potential to the associated thyristors and serve under control of the CPU, to turn on and off the thyristors.

Figure 4:
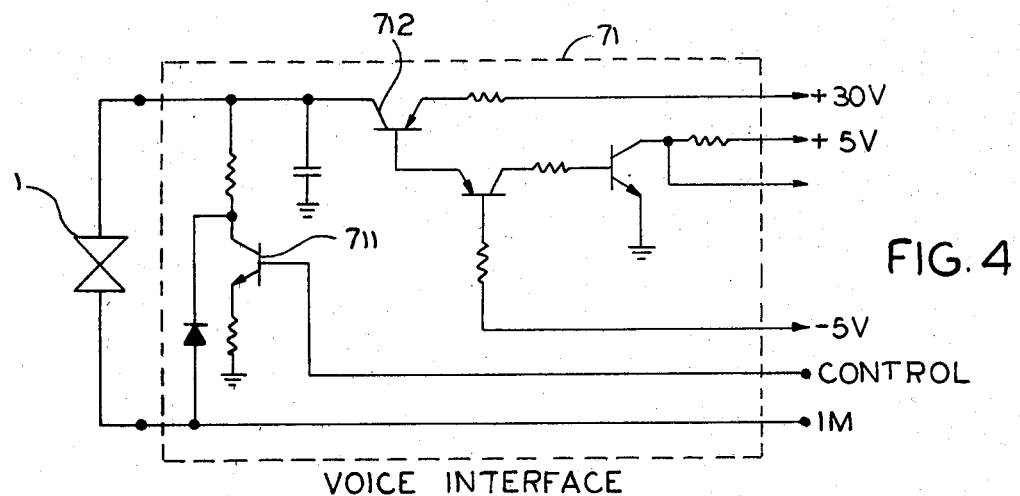
FIG. 4 is a circuit diagram of the main voice interface between the telephone station sets and the switching network.

The main and auxiliary communication paths are in connection with main communiction path interfaces 71 and auxiliary communication path interfaces 72, respectively. As shown in detail in FIG. 4, each of these interfaces includes a transistor arranged as at 712 to supply the anode potential to the associated thyristors in the matrix 210, via the telephone station set 1, and also to supply a constant current to the thyristors after it is turned on. Another transistor 711 is arranged to momentarily reduce the anode potential of the thyristors, under the command of the CPU, in order to turn off the thyristors.

Figure 5:
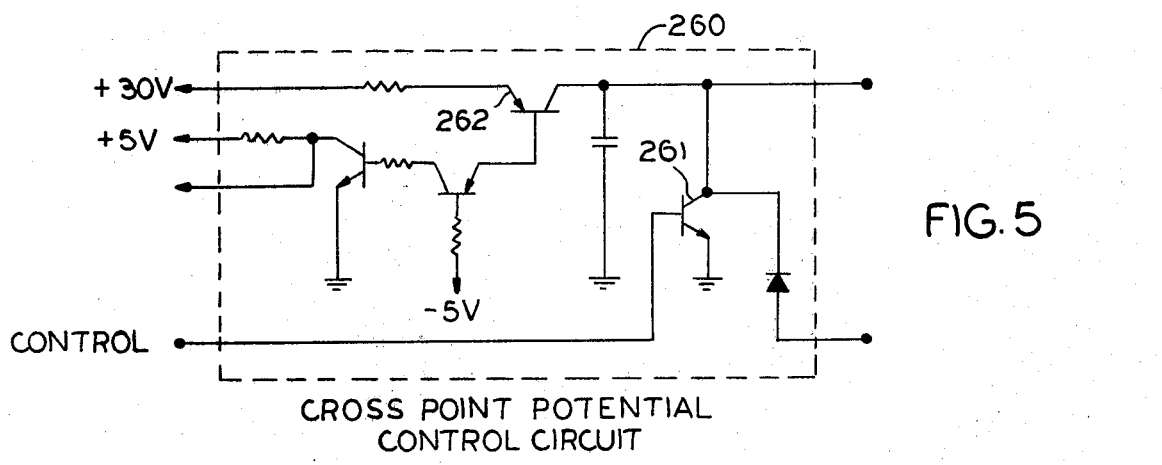
FIG. 5 is a diagram of one of the power circuits provided to feed the thyristors of the coupling matrix with a DC potential for the on-off control of the thyristors.

Circuits 260, (FIGS. 3 and 5) are connected to the respective conductors 231-234 and serve to control the anode potential of the associated thyristors in the coupling matrix under the control of the CPU. As shown in detail in FIG. 5, each crosspoint potential control circuit 260 includes a transistor 262 for supplying a constant current and a CPU-controlled transistor 261. The thyristors (such as indicated at 211-1 in FIG. 3) are switched on when the associated gate common line is fed with a positive pulse from the gate power circuit 90 with the transistor 241 of the power supply 240 turned on to reduce the cathode potential of the thyristor to ground. Switching off of the thyristors is effected by controlling the transistor 711 (FIG. 4) in the main voice interface 71 to reduce the thyristor anode potential.

Figure 6:
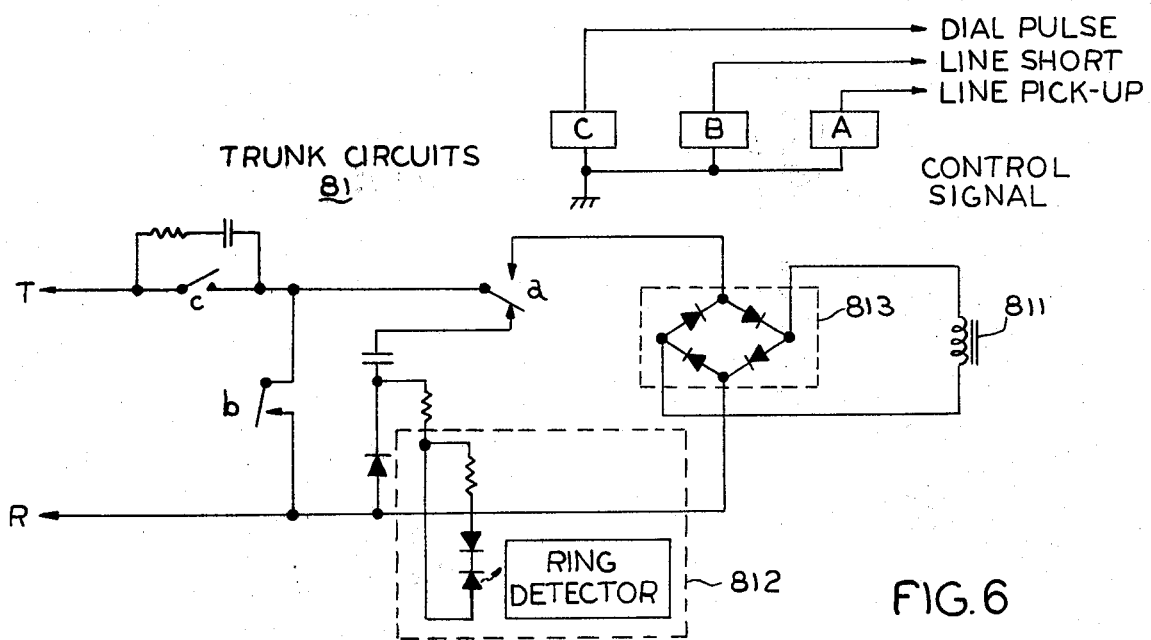
FIG. 6 is a trunk circuit diagram.

Trunk circuits 81 is coupled to the respective trunk paths 211-213. Each trunk circuit includes, as shown in detail in FIG. 6, a transformer secondary winding 811, a ring signal detector circuit 812, and is connected through a dial signal converter to the CO/PBX line. Also included in each of the trunk circuits is a rectifier bridge circuit 813 which is connected to the secondary coil winding so that the coil is fed with a unidirectional current irrespective of the polarity appearing on the CO/PBX line. A relay contact a is positioned as shown for detection of the ring tone of an incoming CO/PBX line signal and is connected for conversion to the bridge circuit side. A relay contact c is provided for dial pulse generation and a relay contact b is also closed when dial pulses are generated.

A trunk circuit 82 (FIG. 3) identical in structure of the trunk circuit 81 (FIG. 6) is not connection with any CO/PBX lines, since it is assigned to an intercommunication path. Either of the trunk circuits 81 or 82 can be assigned to a trunk path for a CO/PBX line or an ICM path by changing the program assignments of the CPU as occasion demands. Tone trunks 84-86 are connected to the respective trunk paths 215-217. Each tone trunk includes a circuit for controlling the associated thyristors and a circuit for AC-coupling the signal tones in order that the different tone signals may be transmitted through the trunk path.

A description will next be made of the operation of the system embodying the present invention in actual communication cases.

When, at a telephone station set, e.g., 1 (FIG. 1), the handset is lifted, the off-hook signal is converted into a data signal, which is sent over the data transmission line 1DS into the data interface 60 of the key service unit 100. Processing the data, the CPU provides commands as for preparing the system for connection with a CO telephone line. Subsequently, when at the same station set 1 the central office line button corresponding to the trunk path 211 is depressed for requesting a central office line connection, the data signal is transmitted through the data interface 60 to the CPU and a signal indicating the use state of the central office line button is sent over the data receive line 1DR to the station set 1 with the result that the LED for the central office line button is lighted. At the same time with this, the CPU sends a signal to the gate power circuit 90 and the base terminal of power transistor 241 (FIG. 3) so that the thyristor 211-1 at the crosspoint between the gate common line 91 and talking path 211 is switched on. Subsequently, as the dial buttons are depressed at the calling station set, data signals corresponding to the respective dial buttons are sent over the data transmit line 1DS (FIG. 1) and through the data interface 60 to the CPU, which, distinguishing such signals as a dial signal, causes the dial signal generator or converter 40 to send out a dial signal into the central office line which is now connected thereto to call the remote telephone set. When there is an answer at the called telephone, the user of station set 1 can start voice communication therewith through the handset, main talking path 1M, thyristor 211-1 (FIG. 3), now in its ON state, and trunk path 211.

Now assume that, when the station set 1 is in the BUSY state, talking with a central office line telephone, an intercom call is initiated for the station set 1 from another station set, e.g., 2, in the system. When the handset is lifted at the station set 2, the off-hook signal is sent out as a data signal to the CPU, in the same manner as described previously in connection with the station set 1. Next, when the intercom button is depressed which corresponds to one of the trunk paths, 214, specified in advance as an intercom talking path, the corresponding data signal is again sent to the CPU, which issues commands for preparing intercommunication. Accordingly, the main talking path 2M for the telephone station set 2 is registered as "in use" so as not to receive any call from other station sets.

Further the thyristor 215-2 (FIG. 3) at the intersection of the main talking path 2M with the unidirectional tone trunk path 215. The intercom dial tone is sent out through the associated unidirectional tone trunk 84 and thyristor 215-2, as an indication of "ready for dialing", to the handset of the calling station set 2. As the intercom telephone number of station set 1 is dialed at the station set 2, the dial pulses are sent successively into the key service unit as a dial signal. Under control of the CPU, the thyristors 214-2, 221-1 and 214-4 are switched on as the gate power circuit 90 sends out positive pulses into the gate common lines 93, 97 and 92 and the transistors 251 and 241, respectively, of the CPU-controlled power source 250, and the power source 240 connected with the intercom talking path 214 are turned on.

At this point, the intercom call from the station set 2 is transmitted to the speaker 111 (FIG. 2a) of station set 1 through the main talking path 2M associated with the calling station set 2, thyristor 214-2 (FIG. 3), intercom talking path 214, thyristor 214-4, conductor 221, thyristor 221-1 and auxiliary talking path 1S of called station set 1. Now the user of the latter station set 1 can talk back hand-free through the microphone 112 for free intercommunication with no button operation required therefor.

In order to disconnect the central office line, previously connected to the station set 1, for intercom talking through the handset, it is only necessary to depress the intercom button on the handset while it is being held lifted. As soon as the CO line is disconnected, the stored program control is started to enable intercom talking through line 1M, crosspoint 214-1, trunk path 214, crosspoint 214-2 and line 2M.

Described above is the hand-free talk back which occurs when a station set received an intercom call during a call with a CO line telephone. It is to be understood that, even when the station set 1 is talking with another station set in the system through the main talking path 1M as well as when the station set 1 is "idle", it can answer through the auxiliary talking path 1S by talking back hand-free.

Though, in the embodiment described, only the trunk path 214 is designated as an intercom talking path, it will be apparent that a number of such intercom talking paths may be provided, if desired, which corresponds to the number of hand-free talk-back communications allowed at a time by the auxiliary switch matrix provided.

Ordinarily, in a key telephone system, CO/PBX or intercom lines can be provided in the same number as that of trunk paths and the trunk paths are each changeable from CO/PBX to intercom communication use and vice versa in accordance of the number of intercom talking paths required. Such switching of trunk paths may be effected under the control of a programming card 65 (FIG. 1). Incidentally, the number of hand-free talk-back communications to be allowed at a time by the auxiliary switch matrix may usually be less than the number of trunk paths in the system.

Although, in the embodiment described, thyristors are used as voice switches, it will be obvious that transistors or FETs may be employed instead.

Further, in the embodiment described two pairs of data lines are provided; however, a single pair of such lines may be provided, instead, for combined transmission and reception use as disclosed in the U.S. Pat. No. 3,843,845.

In summary, according to the present invention, a key telephone system has been realized which includes, as a key service unit, a switching network comprising a main switch matrix formed of main talking paths and trunk paths, an auxiliary switch matrix formed of auxiliary talking paths and a coupling matrix between the main and auxiliary switch matrices and in which each of the telephone station sets can be connected at the same time with a plurality of talking paths for communication therethrough.

What is claimed is:

1. An electronic key telephone system of the type having a plurality of key telephone station sets, at least some of said station sets having a telephone handset, a microphone, a loud speaker and a data circuit means, a plurality of CO/PBX or intercom telephone lines; and a key service unit including central switching means for selectively establishing connections between said station sets and said telephone lines, central control means for controlling said station sets and said central switching means, said key telephone system comprising at least one pair of data lines connecting said data circuit means to said central control means, a pair of main voice communication paths connecting said telephone handset to said central switching means, a pair of auxiliary voice communication paths respectively connecting said microphone and said speaker to said central switching means, and said central switching means comprising: a main switching network including a matrix of switch element means arranged at crosspoints for switching voice paths between said main communication paths and trunk paths associated with said matrix, an auxiliary switch network including switch element means arranged at crosspoints for switching voice paths between said auxiliary communication paths and conductors extending across said auxiliary communication paths, and a coupling switching network including a matrix of switch element means arranged at crosspoints for switching voice paths between conductors which are AC-coupled with said trunk paths and conductors extending across said auxiliary communication paths.

2. The key telephone system of claim 1 wherein each of said crosspoints comprises at least a thyristor, and means for selectively powering particular ones of said thyristors to enable a selection of a predetermined crosspoint.

3. The key telephone system of claim 1 and means for establishing concurrent switch paths through said main switching network and said auxiliary switching network whereby said key telephone sets may be involved in at least two simultaneous telephone calls.

4. The key telephone set of claim 3 wherein at least one of said calls utilizes said microphone and speaker.

* * * * *

UNITED STATES PATENT AND TRADEMARK OFFICE
CERTIFICATE OF CORRECTION

PATENT NO. : 4,236,049

DATED : November 25, 1980

INVENTOR(S) : RYOICHI TANIHATA, TSUNEHIKO SHIMAZAWA AND YOSHINISA SHIBAYAMA

It is certified that error appears in the above-identified patent and that said Letters Patent are hereby corrected as shown below:

Abstract, Line 2, "Comprises" should be --comprised--;

Col. 1, Line 27, after "Baseband," insert --and--;

Col. 1, Line 50, after "system" insert --.--; "each" should be --Each--;

Col. 1, Line 58, "System At" should be --System. At--;

After "System" (second occurrence) insert --,--;

Col. 1, Line 59, "Complete" should be --Completes--;

Col. 2, Line 14, "Aranged" should be --Arranged--;

Col. 3, Line 53, "LDEs" should be --LED's--;

Col. 3, Line 67, "Aranged" should be --Arranged--;

Col. 4, Line 18, "Communiction" should be --Communication--;

Col. 4, Line 53, "a" should be --$\underline{a}$--; "c" should be --$\underline{c}$--;

Col. 4, Line 56, "b" should be --$\underline{b}$--;

Col. 4, Line 59, after "(Fig. 3)" insert --,--; "of" should be --to--;

UNITED STATES PATENT AND TRADEMARK OFFICE
CERTIFICATE OF CORRECTION

PATENT NO. : 4,236,049

DATED : November 25, 1980

INVENTOR(S) : RYOICHI TANIHATA, TSUNEHIKO SHIMAZAWA AND YOSHINISA SHIBAYAMA

It is certified that error appears in the above-identified patent and that said Letters Patent are hereby corrected as shown below:

Col. 4, Line 60, after "(Fig. 6)" insert --,--; "Connection" should be --Connected--;

Col. 5, Line 54, after "(Fig. 3)" insert --is turned on--.

Signed and Sealed this

Nineteenth Day of May 1981

[SEAL]

Attest:

RENE D. TEGTMEYER

Attesting Officer

Acting Commissioner of Patents and Trademarks